H. STERNBERG & J. FURBY.
GANG OR SULKY PLOW.
APPLICATION FILED FEB. 25, 1911.
1,029,033.
Patented June 11, 1912.
2 SHEETS—SHEET 1.
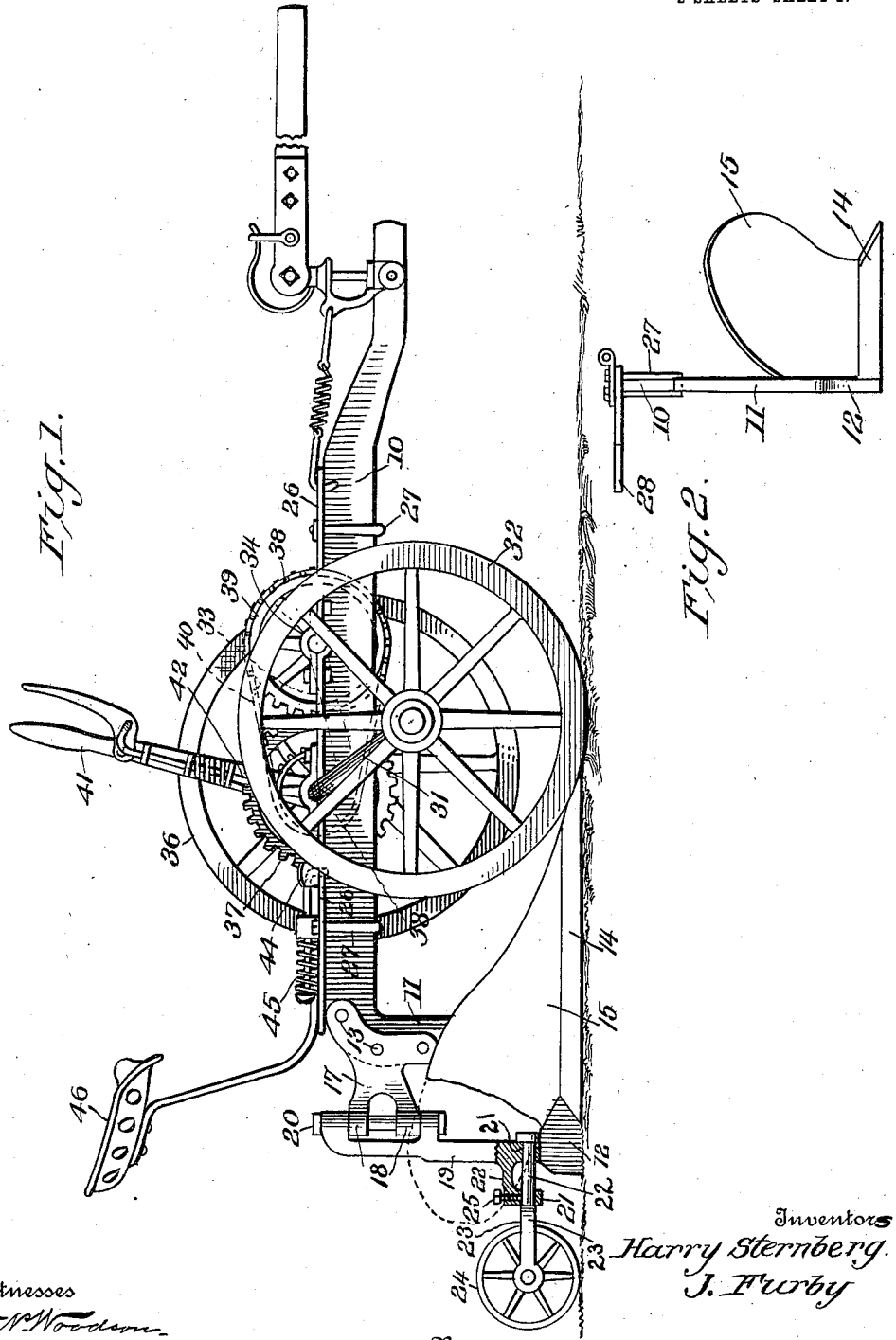
Witnesses
W. N. Woodson
Juana M. Fallin
Inventors
Harry Sternberg.
J. Furby
By
H. A. Stacy, Attorneys.

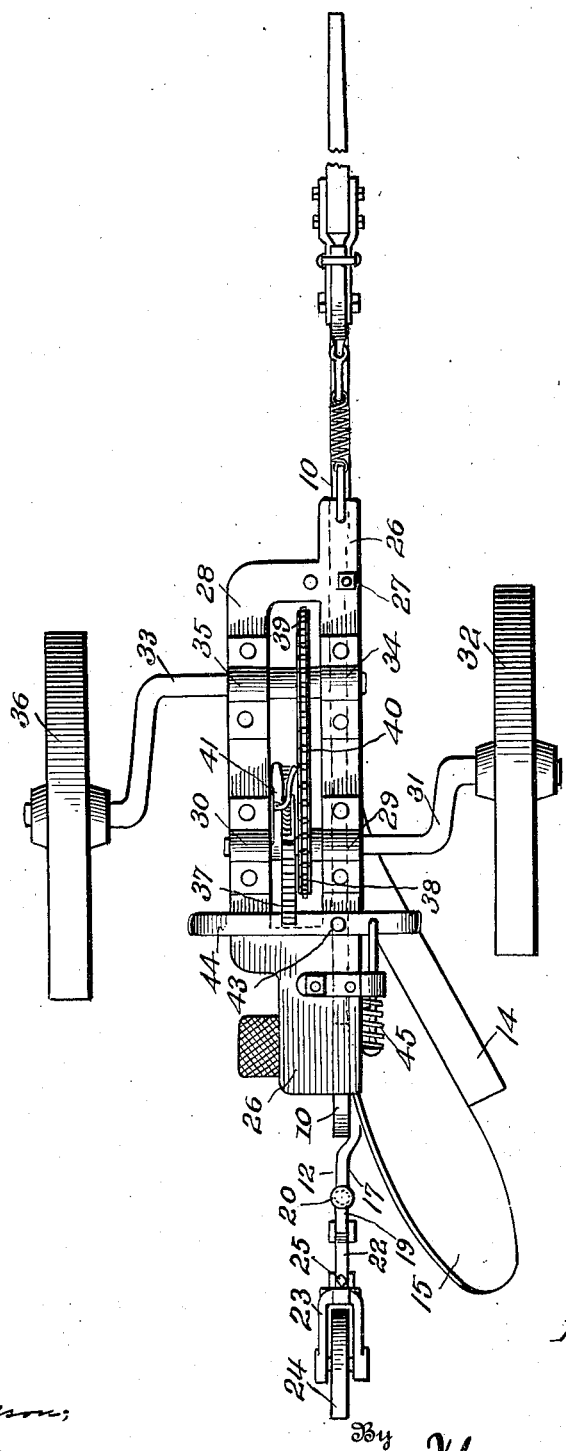

UNITED STATES PATENT OFFICE.

HARRY STERNBERG AND JESSE FURBY, OF NASHVILLE, ILLINOIS.

GANG OR SULKY PLOW.

1,029,033. Specification of Letters Patent. Patented June 11, 1912.

Application filed February 25, 1911. Serial No. 610,876.

*To all whom it may concern:*

Be it known that we, HARRY STERNBERG and JESSE FURBY, citizens of the United States, residing at Nashville, in the county of Washington and State of Illinois, have invented certain new and useful Improvements in Gang or Sulky Plows, of which the following is a specification.

This invention relates to improvements in sulky plows, and has for one of its objects to improve the construction and increase the efficiency and utility of devices of this character.

Another object of the invention is to provide a device of this character wherein provision is made for simultaneously adjusting the land wheel and the furrow wheel and also for independently adjusting the wheels and likewise locking them in their adjusted positions.

With these and other objects in view the invention consists in certain novel features of construction as hereinafter shown and described and then specifically pointed out in the claims, and in the drawings illustrative of the preferred embodiment of the invention, Figure 1 is a side elevation of the improved device; Fig. 2 is a rear elevation of the mold board and the beam and integral landside and the main supporting plate with the trailer wheel detached; and Fig. 3 is a plan view of the improved apparatus. Fig. 4 is a sectional detail illustrating the construction of a portion of the transmission gearing.

Corresponding and like parts are referred to in the following description and indicated in all the views of the accompanying drawings by the same reference characters.

The improved device comprises a main beam 10 directed downwardly at the rear, as shown, to form the standard portion 11 of the plow and with the land-side 12 integral with the standard. The share 14 and the mold board 15 are connected to the standard in the usual manner. Connected to the standard portion 11 by bolts or other suitable means 13 is a bracket 17 having vertical bearings 18 operating to support a swinging standard 19 through the medium of a pivot pin 20 which extends through the bearings 18. At its lower end the standard 19 is provided with spaced bearings 21 in which the journal portion 22 of a yoke 23 is mounted to rotate, the yoke carrying a caster wheel 24, as shown. One of the bearings 21 is provided with a set screw 25 operating to lock the journal 22 of the yoke in any desired position. By this simple means an effectual adjustable caster wheel is produced which is free to swing laterally with the standard 19 upon the pin 20 and rotatable upon its journal 22 to cause the wheel to travel at any desired angle through the co-action of the journal 22 and set screw 25. By this means the caster wheel may be caused to travel in any required position in the furrow, and thus assist in controlling the draft.

Bearing upon the upper face of the beam 10 is a longitudinally extending plate 26, the plate being firmly secured to the beam by suitable clips 27.

The plate 26 is provided with a lateral off-set 28 extended in parallel relation to the body of the plate.

The plate 26 with its offset 28 is provided respectively with bearings 29—30 to receive a crank axle 31 carrying a furrow wheel 32, while a similar crank axle 33 is mounted for oscillation in bearings 34—35 on the plate 26 and its offset 28 and carries the land wheel 36, the crank axles extending from opposite sides. Loose upon the crank axle 31 and operating between the plate 26 and its offset 28 is a toothed wheel 37, and connected to rotate with the wheel 37 is a chain wheel 38, while another chain wheel 39 is connected to rotate with the crank axle 33 and connected to be operated by a chain 40 from the wheel 38, as shown. The wheels 37 and 38 are preferably integral as shown in Fig. 4. Connected rigidly to the crank axle 31 is a lever arm 41 having a spring controlled pawl 42 adapted for engagement with the teeth of the wheel 37. Pivoted at 43 to the plate 26 is a lock lever 44 which engages with the teeth of the wheel 37 and is maintained yieldably in engagement with the wheel by a spring 45. The lever 44 is located in convenient position for the feet of the driver upon the seat 46. By this simple arrangement it will be obvious that the driver by holding the pawl 42 released from the wheel 37 can adjust the crank axle 31 and the furrow wheel 32 to any required extent within the range of the movement of the lever to raise and lower the same, and without affecting the movement of the land wheel, and then lock the furrow wheel at any point of its adjustment by releasing the pawl and permitting it to engage with the nearest tooth of the wheel 37, the latter being locked in stationary position by the foot lever 44. Then when it is desired to adjust the land wheel, the driver releases the foot lever 44 and actuates the lever 41 without releasing the pawl 42, causing the chain wheel 38 to actuate the chain wheel 39 and the crank axle 33 and thus adjust the land wheel. When the land wheel has been adjusted to the required extent the driver releases the foot lever to permit it to engage with the toothed wheel 37 and thus lock both of the axles in stationary position, and then by releasing the pawl grip 42 the driver can readjust the furrow wheel to any desired extent. Thus the land wheel and the furrow wheel may be readily adjusted as required by the driver without leaving his seat.

The improved device is simple in construction, can be readily attached without material structural change to plow beams of various forms and sizes and to sulky plows of various constructions, and may be likewise adapted for gang plows of various sizes and makes.

Having thus described the invention, what is claimed as new is:—

1. An attachment for plows, comprising a plate adapted to be attached to a plow beam, a crank axle carrying a furrow wheel and mounted for rotation upon said plate, a crank axle carrying a land wheel and mounted for rotation upon said plate, an operating lever connected to the furrow wheel axle, a toothed wheel loose upon said furrow wheel axle, means supported upon said plate for locking said toothed wheel, and a locking lever connected to said furrow wheel axle and provided with a pawl for engagement with said toothed wheel.

2. An attachment for plows, comprising a plate adapted to be attached to a plow beam, a crank axle carrying a furrow wheel and mounted for rotation upon said plate, a crank axle carrying a land wheel and mounted for rotation upon said plate, a toothed wheel and a chain wheel carried by said furrow wheel axle, another chain wheel carried by the land wheel axle, a chain leading over said chain wheels, a lock device operating to engage the toothed wheel, an operating lever connected to the furrow wheel axle, and a spring pawl carried by the lever and engaging with the toothed wheel.

3. The combination with a plow including a beam and moldboard, of a crank axle carrying a furrow wheel and mounted for rotation relative to said beam, another crank axle carrying a land wheel and mounted for rotation relative to said beam, means for communicating motion from said furrow wheel axle to said land wheel axle, a toothed wheel loose upon said furrow wheel axle, means supported from said beam for locking said toothed wheel, and a locking lever connected to said furrow wheel axle and provided with a pawl for engagement with said toothed wheel.

In testimony whereof, we affix our signatures in presence of two witnesses.

HARRY STERNBERG. [L. S.]
JESSE FURBY. [L. S.]

Witnesses:
W. P. GREEN,
GEORGE MARTIN.

---

Copies of this patent may be obtained for five cents each, by addressing the "Commissioner of Patents, Washington, D. C."